Patented Nov. 24, 1953

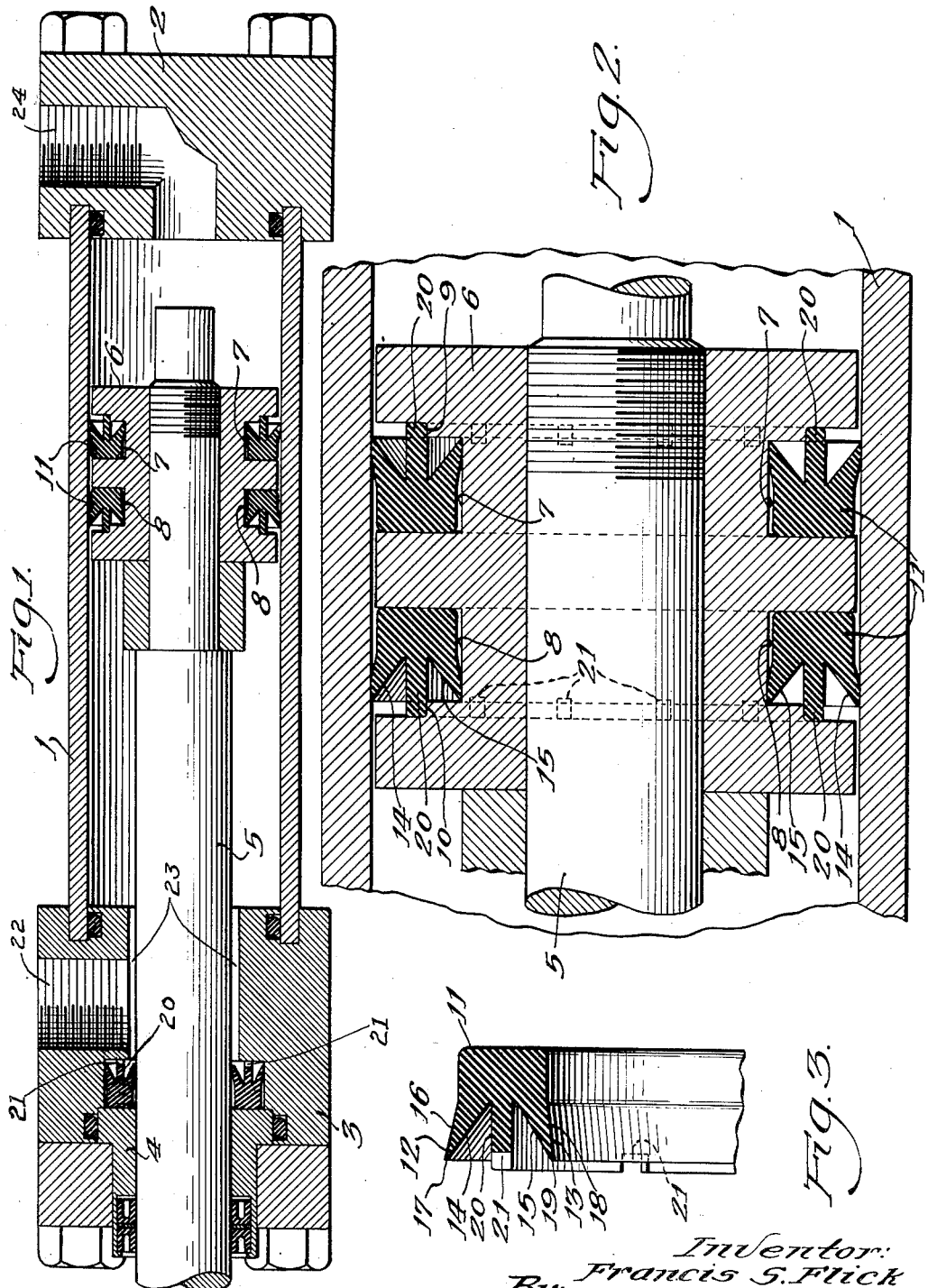

2,660,493

UNITED STATES PATENT OFFICE 2,660,493

PISTON AND PISTON RING ASSEMBLY

Francis S. Flick, Chicago, Ill., assignor to Miller Motor Company, a partnership consisting of William J. Reedy and Francis S. Flick Application November 10, 1948, Serial No. 59,378

2 Claims. (Cl. 309—23)

This invention relates to a piston and piston ring or seal assembly having piston seals of flexible material such as synthetic rubber or the like, in which the piston seals are so formed and so arranged in the piston as to provide a more effective sealing of the piston with relation to the cylinder, and without danger of the piston seals collapsing or curling up during operation.

In flexible piston seals having a channel in one face, as heretofore known, there has always been the danger and frequent occurrence of such flexible channel seals collapsing and curling up during reciprocation of the piston in the cylinder. This I have completely prevented in the present invention by providing in channel seals, a central annular tongue having its free edge resting on an annular shoulder in the piston and notches of greater depth than the width of the shoulder to permit pressure to be equalized on both sides of the tongue.

Among the objects of my invention are: to provide a novel and improved piston seal; to provide a novel and improved piston and piston seal assembly; to provide piston seals overcoming the objections and possessing the advantages referred to above; to provide a piston and piston seal assembly in which each of the piston seals is formed on each side with a longitudinally extending skirt, and a central tongue; to provide a novel arrangement of said piston seals in the piston and having means for equalizing the pressure on both sides of the tongue; to provide a piston seal having greater efficiency and one that will not collapse or curl up during operation; to provide a piston seal flared on both sides to form diverging skirts and having a flared channel between said skirts and a longitudinally extending tongue in said channel; and such further objects, advantages and capabilities, inherently possessed by my invention, as will later more fully appear.

The invention is illustrated in a preferred embodiment in the accompanying drawing, in which—

Fig. 1 is a central longitudinal section through a cylinder and piston having an assembly of piston seals, embodying my invention.

Fig. 2 is a fragmentary enlarged longitudinal central section of the piston, piston seals and associated walls of the cylinder of Fig. 1.

Fig. 3 is a fragmentary transverse section through the piston seal embodying my invention, and showing the piston seal before being assembled on the piston.

In the embodiment shown in the drawings, for illustrative purposes, the cylinder 1 has mounted at one end the cap cylinder head 2, and at the other end the rod cylinder head 3 in which is secured the piston rod bushing 4 in which is slidably mounted the piston rod 5 having fixed to its end within the cylinder a piston 6. For convenience herein the cap end 2 of the cylinder will be referred to as the rear end, and the rod end 3 will be referred to as the front end. Piston 6 is formed in its outer circumferential surface with a pair of longitudinally spaced grooves 7 and 8, groove 7 having formed on its rear side wall the annular shoulder 9, and the groove 8 having formed on its front side wall a similar annular shoulder 10.

Positioned in each of the annular grooves 7 and 8 is a flexible piston seal preferably formed of synthetic rubber or the like. While I have referred to synthetic rubber I wish it understood, however, that other flexible material suitable for the purpose may be used as desired. One of these piston seals before being applied to the piston, and in released position, is shown in cross section in Fig. 3. This piston seal comprises a heel portion 11 and two toe portions 12 and 13, these two toe portions in effect constituting a pair of laterally spaced apart tapered skirts. As will be seen in Fig. 3 these two skirts have between them an inwardly extending channel the side wall 14 of which is outwardly inclined and the side wall 15 of which is inwardly inclined. Also it is to be noted that the outside wall 16 of the toe portion 12 is also outwardly inclined so as to meet the wall 14 at the annular apex 17, while the radially inner wall 18 of the toe portion 13 is inwardly inclined to meet the wall 15 at the annular apex 19. It is thus seen that these two skirts diverge with relation to each other, but each of them have converging side walls meeting in an annular apex which is preferably somewhat blunted with a small narrow flattened end.

Secured to, preferably by being integral with, the inner base wall of the channel between the skirts or toe portions 12 and 13, is an annular tongue 20 which at its free edge extends beyond a plane passing through the apices 17 and 19. The free end of tongue 20 is also formed at circumferentially spaced positions with a plurality of notches 21 for a purpose to be later more fully explained. It is thus seen that the outer and inner side walls of the heel portion 11 are parallel in a transverse cross section, while the two side walls 16 and 18 of the toe portions are, before the seal is applied to the piston, divergently flared or inclined from approximately the middle of the seal to the apices 17 and 19.

As seen in Fig. 2 one of these piston seals is positioned in each of the annular grooves 7 and 8, with the tongue 20 of one of these seals extending rearwardly while in the other one the tongue 20 extends forwardly. As will be understood each of these piston seals may be stretched the necessary amount to cause it to pass over the outer circumference of the piston and when coming in alignment with its respective groove 7 or 8 it will contract and when released seat itself in the respective groove. At this time the tongue 20 of the rear piston seal will be laterally seated against the annular shoulder 9, while in the front piston seal this tongue 20 will be laterally seated against the annular shoulder 10. When the piston with the piston seals assembled thereon, is forced into the cylinder, the outer wall 16 of the skirt or toe portion 12 will be flattened into parallelism with the inner cylinder wall for approximately one-half (more or less) of the length of the skirt or toe portion, the same being also true of the inner skirt or toe portion 13 with relation to the bottom of the respective annular grooves 7 or 8 as will be understood in Fig. 2. The outside diameter of the piston is slightly less than the inside diameter of the cylinder in which it reciprocates so as to give freedom of movement therein. Any pressure from the high pressure side of the piston that may escape along the outer surface of the piston to the front of the piston seal will pass first into the space above the tongue 20 in the piston seal facing toward the high pressure side (the left piston seal in Fig. 2 when the piston is moving to the right and the right piston seal when the piston is moving to the left) which will force the outer toe portion against the inner surface of the cylinder and bring part of the length of such toe portion into parallelism with the inner cylinder wall as seen in Fig. 2 to seal the piston with relation to the cylinder walls as its moves therealong. To prevent this pressure from bending the tongue 20 inwardly the notches 21 are provided in the outer free edge of the tongue, which will permit such pressure to equalize in the space inside of the tongue which will also press a part of the length of the inside toe portion or skirt into parallelism against the bottom of the grooves 7 or 8. When the piston moves to the left as viewed in Fig. 2 the same action will occur in the right hand piston seal of Fig. 2. In other words this action occurs in that piston seal which is nearest to the side of the piston against which the high pressure is acting. The provision of tongue 20 and the resting of the same on the annular shoulder 9 or 10, depending upon which direction the piston is moving, will give support to the body of the piston seal and prevent it from collapsing or curling during movement of the piston in the cylinder.

A further application of the seal of the present invention is for sealing the inside of the front cylinder head 3 with relation to the piston rod 5 as shown in the left hand side of Fig. 1. In this latter instance the shoulder for supporting the tongue 20 has been omitted but the structure of the seal member is the same as shown in Fig. 3 and described above. In the form shown in the left hand side of Fig. 1 the pressure medium enters (and is exhausted through) the opening 22 and passes to the interior of the cylinder through the cylindrical annular space 23 which space is extended at its end opposite from the cylinder to permit entry of the pressure medium into the spaces in the grooved side of the seal. This pressure, as in the preceding form of the seal, is equalized on both sides of the tongue 20 by reason of the circumferentially spaced slots or notches 21. In general the action of the seal shown in the left hand side of Fig. 1 is the same as that described earlier herein. As will be understood an inlet and exhaust opening 24 is provided at the opposite end of the cylinder for entry and exhaust of the pressure medium to the rear side of the piston.

The foregoing detailed description is given for clearness of understanding only, and no unnecessary limitations should be understood therefrom, for some modifications will be obvious to those skilled in the art.

Having described my invention, I claim:

1. A piston seal formed of synthetic rubber and the like having a substantially homogeneous body portion formed with parallel side walls and a longitudinally extending tapered annular skirt on each of the radially outer and inner sides of the body portion, the outer skirt being inclined outwardly, and the inner skirt being inclined inwardly, and an annular tongue extending longitudinally from the body portion between said skirts to beyond the free edges of said skirts.

2. A piston seal formed of synthetic rubber and the like having a substantially homogeneous body portion formed with parallel side walls and a longitudinally extending annular skirt on each of the radially outer and inner sides of the body portion, said skirts having a relatively wide base portion and a relatively narrow tip portion, and an annular tongue extending longitudinally from the body portion between said skirts, said seal being stretchable for placement in proper position on a piston.

FRANCIS S. FLICK.

References Cited in the file of this patent

UNITED STATES PATENTS

| Number | Name | Date |
|---|---|---|
| 1,035,279 | Walker | Aug. 13, 1912 |
| 1,362,435 | Neraas | Dec. 14, 1920 |
| 2,081,040 | King | May 18, 1937 |
| 2,127,290 | Farina | Aug. 16, 1938 |
| 2,417,828 | Joy | Mar. 25, 1947 |
| 2,474,132 | Vernet | June 21, 1949 |

FOREIGN PATENTS

| Number | Country | Date |
|---|---|---|
| 527,363 | Great Britain | Oct. 8, 1940 |